US012405579B2

(12) United States Patent
Bourg et al.

(10) Patent No.: US 12,405,579 B2
(45) Date of Patent: Sep. 2, 2025

(54) PRODUCTION OF AN APPLIQUE FOR A TIMEPIECE DIAL

(71) Applicant: ROLEX SA, Geneva (CH)

(72) Inventors: Benjamin Bourg, Annemasse (FR); Daniel Fiammingo, Sciez (FR); Daniel Lopez, Chêne-Bourg (CH); Nicolas Moretti, Chilly (FR)

(73) Assignee: ROLEX SA, Geneva (CH)

( * ) Notice: Subject to any disclaimer, the term of this patent is extended or adjusted under 35 U.S.C. 154(b) by 703 days.

(21) Appl. No.: 17/505,451

(22) Filed: Oct. 19, 2021

(65) Prior Publication Data

US 2022/0121156 A1 Apr. 21, 2022

(30) Foreign Application Priority Data

Oct. 21, 2020 (EP) .................................... 20203114

(51) Int. Cl.
*G04D 3/00* (2006.01)
*G04B 19/10* (2006.01)

(52) U.S. Cl.
CPC ........... *G04D 3/0048* (2013.01); *G04B 19/10* (2013.01); *G04D 3/0069* (2013.01)

(58) Field of Classification Search
CPC .... G04D 3/0048; G04D 3/0069; G04B 19/10; G04B 45/0069
USPC .......................................................... 368/232
See application file for complete search history.

(56) References Cited

U.S. PATENT DOCUMENTS

2017/0261935 A1 9/2017 Charbon
2017/0261936 A1* 9/2017 Charbon ................ G04B 19/12
2019/0143416 A1* 5/2019 Luebbe ................ A44C 5/0053 428/472.1
2019/0210402 A1* 7/2019 Vuille .................. G04B 19/103
2019/0278229 A1* 9/2019 Trotta .................... G04B 19/06
(Continued)

FOREIGN PATENT DOCUMENTS

CH 408789 A 11/1965
CH 640685 A * 1/1984 ............. G04B 19/10
(Continued)

OTHER PUBLICATIONS

Magrini et al., Transparent and tough bulk composites inspired by nacre, Nature Communications (Jun. 26, 2019) (Year: 2019).*
(Continued)

*Primary Examiner* — Regis J Betsch
*Assistant Examiner* — Kevin Andrew Johnston
(74) *Attorney, Agent, or Firm* — Seckel IP, PLLC

(57) ABSTRACT

A method for producing an applique (1; 1'; 1") for a timepiece dial, the applique (1; 1'; 1") having at least two distinct portions (10, 20; 10', 20'; 10", 20") made of a first material and a second material, respectively, the first and second materials being different, wherein the method includes a first phase (E1 to E4; E1' to E4') involving forming at least a second blank (20*a;* 20*a'*) made of the second material within or at least partially within a first blank (10*a;* 10*a'*) made of the first material so as to obtain a blank (1*a;* 1*a'*) of the applique for a timepiece dial, then a second phase of machining (E5, E6; E5', E6') each of the two blanks (10*a*, 20*a;* 10*a'*, 20*a'*), so as to modify the shape and/or the surface state of each of the first and second blanks of the applique blank (1*a;* 1*a'*).

23 Claims, 9 Drawing Sheets

(56) References Cited

U.S. PATENT DOCUMENTS

| | | | | |
|---|---|---|---|---|
| 2020/0269356 | A1* | 8/2020 | Netuschill | B44C 1/225 |
| 2021/0356912 | A1* | 11/2021 | Rossier | G04D 3/0048 |

FOREIGN PATENT DOCUMENTS

| | | | |
|---|---|---|---|
| CH | 712568 | A1 * | 12/2017 |
| CH | 715872 | A2 | 8/2020 |
| EP | 3220209 | A1 | 9/2017 |
| EP | 3241636 | A1 | 11/2017 |
| EP | 3309626 | A1 | 4/2018 |
| EP | 3537226 | A1 | 9/2019 |
| JP | S47-037775 | A | 12/1972 |
| JP | S50-18068 | A | 2/1975 |
| JP | H03-21797 | U | 3/1991 |
| JP | 2017-167134 | A | 9/2017 |
| JP | 2019-521243 | A | 7/2019 |
| JP | 2019-158869 | A | 9/2019 |
| JP | 2019164044 | A | 9/2019 |
| JP | 2021-181981 | A | 11/2021 |

OTHER PUBLICATIONS

European Search Report and Written Opinion dated Apr. 7, 2021 in priority application No. EP20203114.2; with English machine translation (total 13 pages).

JP Office Action and Search Report dated May 27, 2025 in counterpart application No. JP 2021-170787; with English machine translation (total 54 pages) (note: D1-D4 and D6-D11 in the JP Search Report are not listed in this IDS since they are already of record in this application—WO2019530874, D8 in the JP Search Report had its US nat stage published as U.S. Pat. No. 20190210402 of record).

* cited by examiner

PRODUCTION OF AN APPLIQUE FOR A TIMEPIECE DIAL

This application claims priority of European patent application No. EP20203114.2 filed Oct. 21, 2020, the content of which is hereby incorporated by reference herein in its entirety.

The present invention relates to a method for producing an applique for a timepiece dial. It also relates to the production of a timepiece, in particular a wrist watch, implementing such a production method. It also relates to an applique obtained by such a production method, and to a timepiece per se comprising such an applique.

BACKGROUND ART

Appliques formed of two different materials are known in the prior art. Such appliques, which form in particular letters or numbers on a timepiece dial, have an informative function, for example telling the time, but also a decorative function. It is thus essential that such appliques present an impeccable appearance on a dial.

One prior art solution for producing an applique for a timepiece dial composed of two different materials often consists in creating a mold made of the first material, for example a noble metal, and then casting a second liquid material in this mold, which subsequently cures to take on its final appearance. Such a method can achieve satisfactory results but has drawbacks, including the inability to obtain all possible geometries or the most sophisticated types of finish.

Therefore, there is a need for another solution for producing an applique for a timepiece dial. More specifically, the invention seeks to achieve some or all of the following aims.

A first aim of the invention consists in proposing a solution for producing an applique for a timepiece dial in which the production method makes it possible to achieve, in a simple, repeatable manner, an optimal finish in an applique composed of at least two different materials.

A second aim of the invention consists in proposing a solution for producing an applique that can have various three-dimensional shapes.

SUMMARY OF THE INVENTION

To this end, the invention is based on a method for producing an applique for a timepiece dial, said applique comprising at least two distinct portions made of a first material and a second material, respectively, said first and second materials being different, wherein the method comprises:

- A first phase consisting in forming at least a second blank made of the second material within or at least partially within a first blank made of the first material so as to obtain a blank of the applique for a timepiece dial, then
- A second phase of machining each of the two blanks, so as to modify the shape and/or the surface state of each of the first and second blanks of the applique blank.

The second phase of machining may comprise a step of routing (or trimming) of the applique blank formed of the first blank made of the first material and the second blank made of the second material, this routing forming at least a portion of the contour of the applique blank.

The invention further relates to an applique for a timepiece dial, comprising a first portion made of a first material and a second portion made of a second material, said first and second materials being different, wherein the applique comprises a fastening device capable of fastening the applique to a dial, in particular a fastening foot, and an upper surface intended to remain on the visible face of said dial, said upper surface having at least a part that is not parallel to the dial to which the applique is intended to be fastened, said upper surface part comprising said two materials in a juxtaposed arrangement, and/or the applique comprises a side comprising said two juxtaposed materials, said side extending in a direction substantially perpendicular to the dial to which the applique is intended to be fastened.

The invention is defined specifically by the claims.

BRIEF DESCRIPTION OF THE DRAWINGS

These aims, features and advantages of the present invention will be set out in detail in the following description of particular embodiments, which are not limiting, provided with reference to the attached figures, in which.

DETAILED DESCRIPTION OF PARTICULAR EMBODIMENTS

For the sake of simplicity in the description, the following terms will be conventionally used: "longitudinal direction" for the direction x along the length of an applique, and "transverse direction" for the perpendicular direction y, the two directions x, y forming a plane which is substantially parallel to a dial, particularly to a dial plate, on which the applique is mounted or intended to be mounted. The vertical direction is the direction z perpendicular to the first two directions x, y, oriented perpendicularly to the dial, particularly to the dial plate. In the case of a curved dial, the direction z may be considered to be oriented perpendicularly to the plane of a dial passing specifically through the periphery of a dial plate.

The adjectives “upper” and “lower” will be used with reference to the abovementioned vertical direction z, the adjective “lower” designating an orientation of the face intended to be positioned facing a movement and the adjective “upper” designating an orientation of the opposite face, in particular the face visible to the wearer. Furthermore, the term “width” will be used to designate a measurement in a transverse direction or a direction y, the term “length” for a measurement in a longitudinal direction or a direction x, and the term “height” for a measurement in a vertical direction or a direction z.

Moreover, the same reference signs will be used to designate identical or equivalent components, adding the symbols ' and " to distinguish the two variants of the second embodiment from one another.

Figure 1:
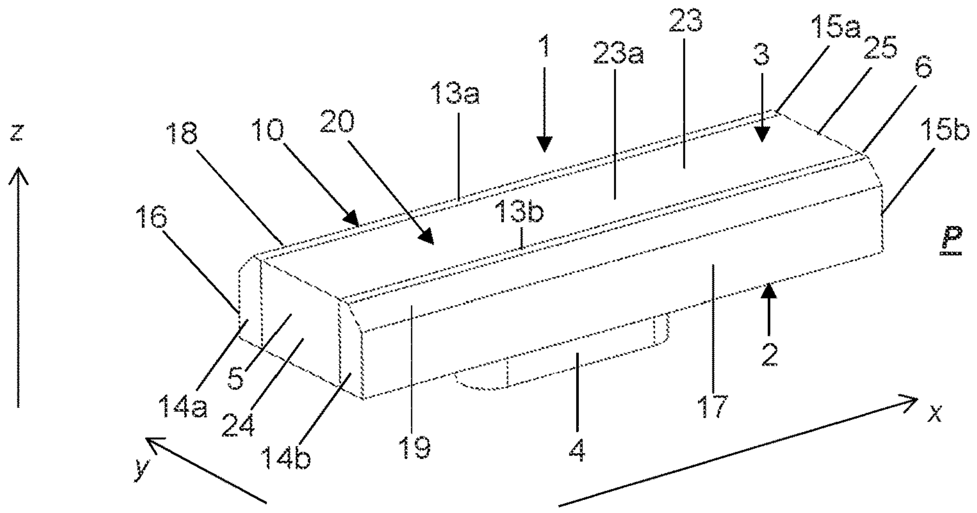
FIG. 1 shows a perspective view from above of an applique for a timepiece dial according to a first embodiment of the invention.
Figure 2:
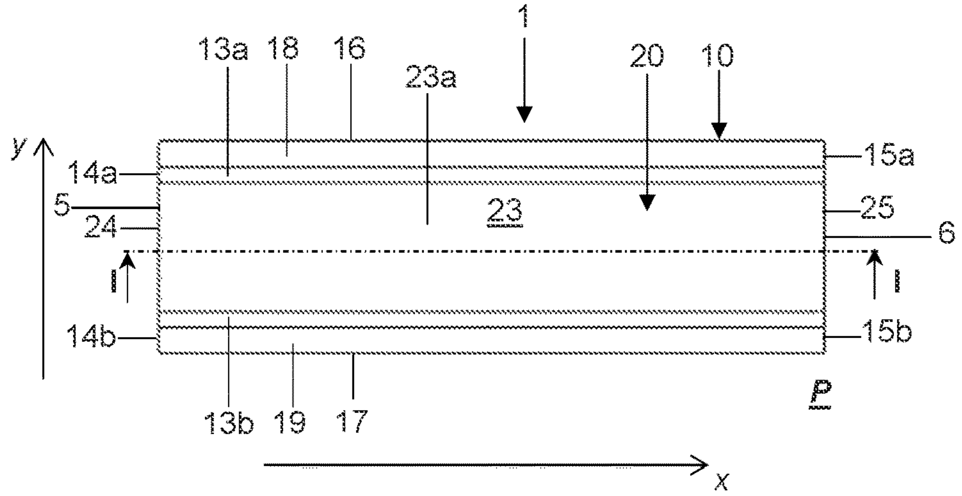
FIG. 2 shows a view from above of the applique for a timepiece dial according to the first embodiment of the invention.
Figure 3:
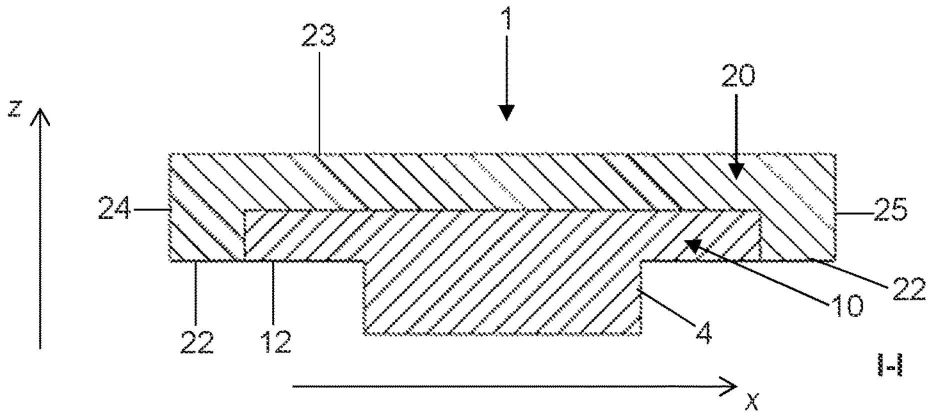
FIG. 3 shows a view in section through a longitudinal midplane I-I of the applique for a timepiece dial according to the first embodiment of the invention.

FIGS. 1 to 3 show an applique 1 for a timepiece dial according to a first embodiment of the invention.

This applique 1 has, overall, a parallelpiped shape, in particular a rectangular parallelepiped shape, delimited by a substantially flat upper surface 3, arranged in a plane parallel to the directions x, y according to the chosen convention, i.e. substantially parallel to a timepiece dial or to a dial plate or to the plane of a timepiece dial or of a dial plate on which the applique is intended to be mounted. It comprises a lower surface 2 intended to be positioned facing a timepiece dial, particularly on a timepiece dial. A fastening device 4 is arranged on this lower surface, taking the form of a foot depending on the embodiment, which projects outward from the applique 1, intended to be positioned in a housing hollowed out in a timepiece dial. Naturally, the fastening device could take any other form, in particular several feet for example. As an alternative, the fastening device could be present on the periphery of the applique. The applique is furthermore delimited by four sides, two long sides 16, 17 along its length (in x-z planes) and two small sides 5, 6 across its width (in y-z planes). A projection of the applique 1 on a plane parallel to the directions x, y in the vertical direction perpendicular to a timepiece dial thus has a rectangular shape. Naturally, as a variant, this shape could be slightly different, for example trapezoidal. In general, this shape may be polygonal. As an alternative, this shape may be curved, in particular rounded or elliptical.

According to this first embodiment, the applique 1 thus comprises two portions 10, 20 made of two different materials. The first portion 10 extends in particular in the lower part of the applique 1, and on the two long sides 16, 17, over the whole length of the applique. The second portion 20 extends in the central part of the upper surface 3, in a groove formed within the first portion 10. It extends over the whole length of the applique 1, and over the whole height of the applique on the small sides 5, 6.

The upper surface 3 is the surface intended to be visible to the wearer of a watch. It thus comprises three parts extending in parallel over its whole length: a central surface 23 made of the second material, arranged between two lateral surfaces 13*a*, 13*b* made of the first material. The upper surface of each lateral surface 13*a*, 13*b* has an inclined flat surface 18, 19, respectively, forming chamfers joining the plane (oriented x-y) of the upper surface to the plane (oriented x-z) of each long side 16, 17 of the applique 1.

The lower surface 2 comprises parts 22 at the longitudinal ends of the applique 1 made of the second material. It further comprises long sides 16, 17, and a central part 12 including the fastening foot, which is made of the first material.

The long sides 16, 17 are therefore made wholly of the first material. By contrast, the small sides 5, 6 each have a central surface 24, 25 made of the second material, flanked by two lateral surfaces 14*a*, 14*b*, 15*a*, 15*b*, respectively, made of the first material. These lateral surfaces 14*a*, 15*a* and 14*b*, 15*b* constitute the ends of the long sides 16, 17, respectively.

Figure 4:
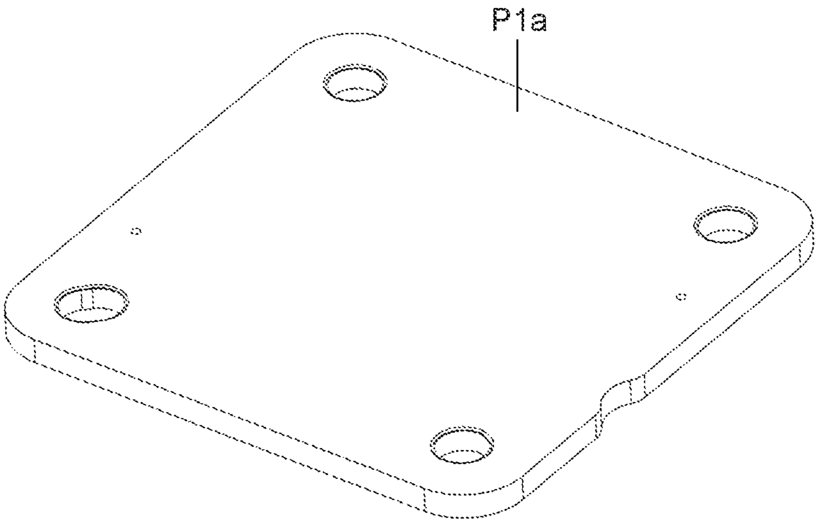
FIGS. 4 to 10 show various steps of a method for producing the applique for a timepiece dial according to the first embodiment of the invention.
Figure 5:
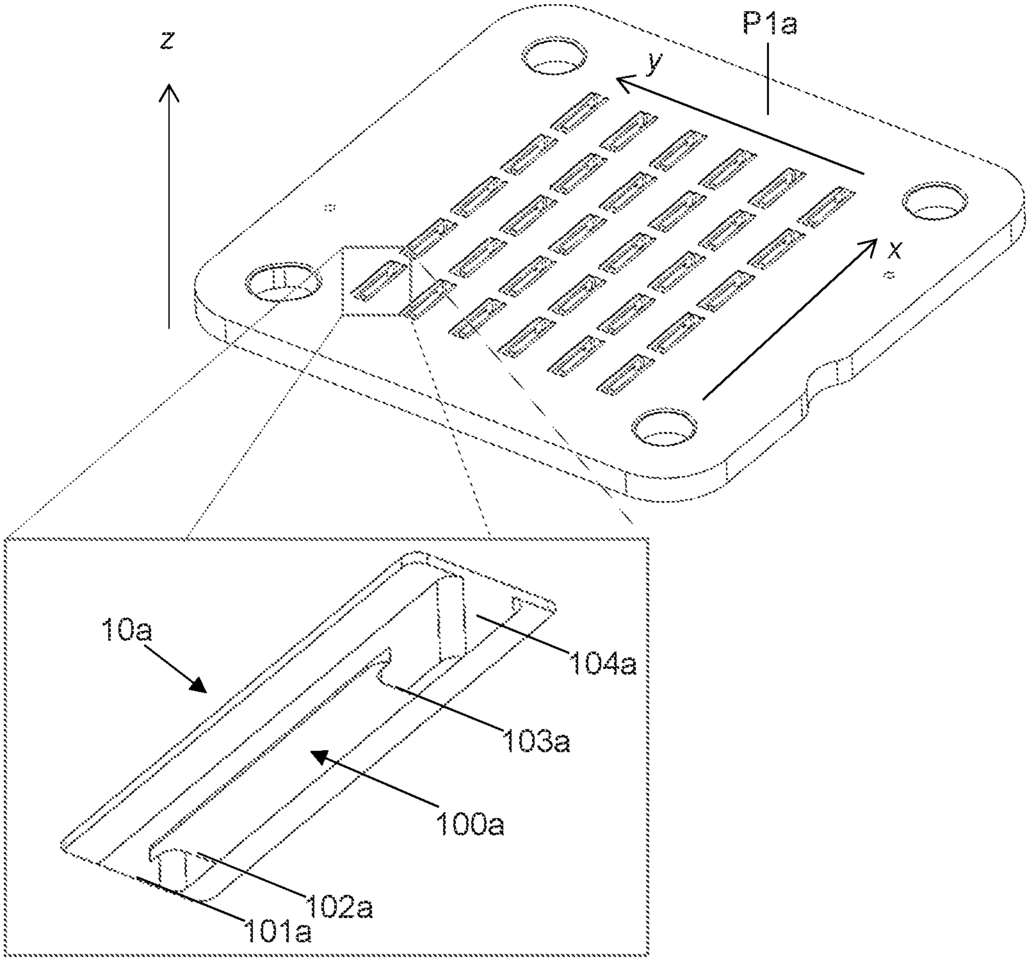
Figure 6:
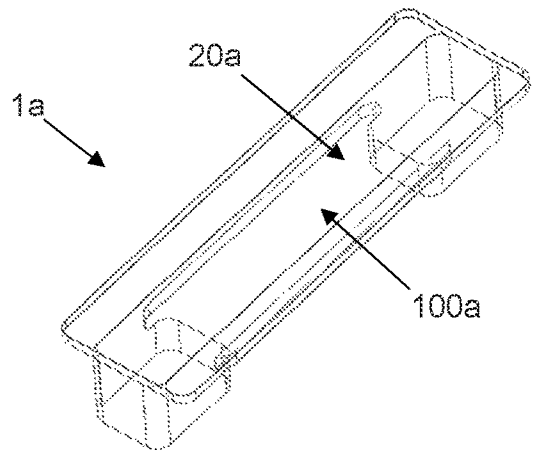
Figure 21:
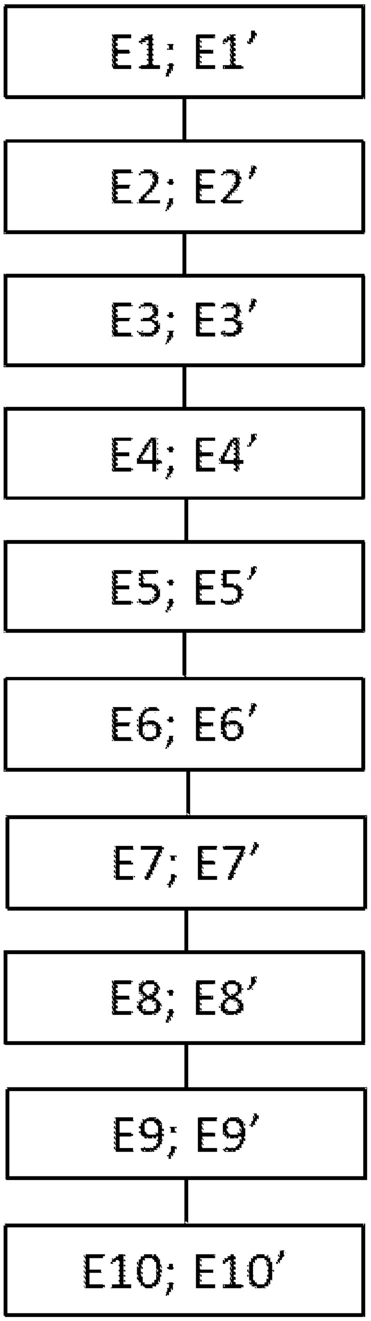
FIG. 21 schematically shows the steps of the production method according to the embodiments of the invention.

FIGS. 4 to 10 show a method for producing an applique 1 according to the first embodiment, the steps of which are summarized in FIG. 21. FIGS. 4 to 6 show a first phase of this method, while FIGS. 7 to 10 show a second phase.

The first phase of the method consists in forming at least a second blank 20*a* made of the second material within or at least partially within a first blank 10*a* made of the first material, so as to obtain a blank 1*a* of the applique 1.

FIG. 4 shows a first step E1 consisting in obtaining a base plate P1*a* made of the first material. This plate is flat and its thickness corresponds substantially to the height of the applique to be produced. Its plane corresponds to the plane x-y of the future applique, according to the chosen convention. In other words, the applique or appliques is/are formed in this plate with the same orientation as it/they would have on a timepiece dial.

FIG. 5 shows a second step E2 of machining a first face of the plate P1*a* so as to form at least a first blank 10*a*. This second machining step removes material so as to form at least partially the contour of at least a first blank 10*a*. This second step forms in particular one or more cavities in the first blank 10*a*, which are intended to receive the second material. In particular, this second step forms a longitudinal groove 100*a* extending at least over the upper surface of the blank 10*a*. It is delimited by vertical sides 101*a*, 102*a*, 103*a* and 104*a* oriented in the transverse direction or the direction y. The result is a first blank 10*a* made of the first material.

Advantageously, this step makes it possible to make several blanks 10*a*, so as to produce several identical appliques 1 in parallel. As an alternative, this step could make several blanks 10*a*, so as to produce several different appliques 1 in parallel. According to the embodiment, the various blanks are arranged in a regular arrangement of rows and columns in the plane of the applique, so as to optimize the surface area available.

FIG. 6 describes a third step E3 of filling the cavities, and more particularly the grooves 100*a* extending at least over the upper surface of each first blank 10*a*, with the second material. Advantageously, this filling is carried out by casting the second material into the cavities and more particularly into the groove 100*a* extending at least over the upper surface of each first blank 10*a*.

A fourth step E4 consists in curing (hardening) the second material, in particular by cross-linking. This makes it possible to form a second blank 20*a* made of the second material. The two blanks 10*a*, 20*a* thus form a blank 1*a* of the applique 1 to be produced.

A second phase, referred to as the machining phase, of the method is then begun.

Figure 7:
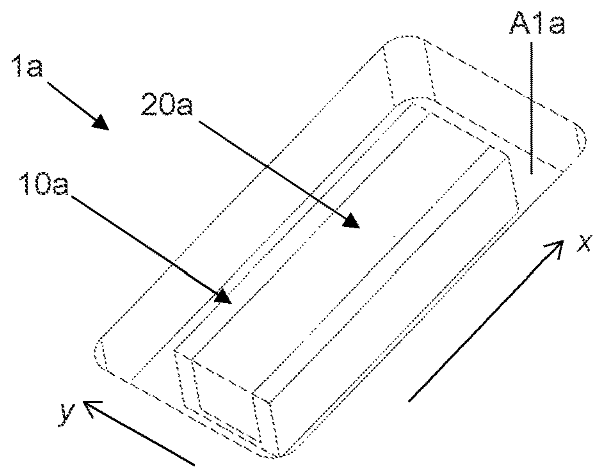
Figure 8:
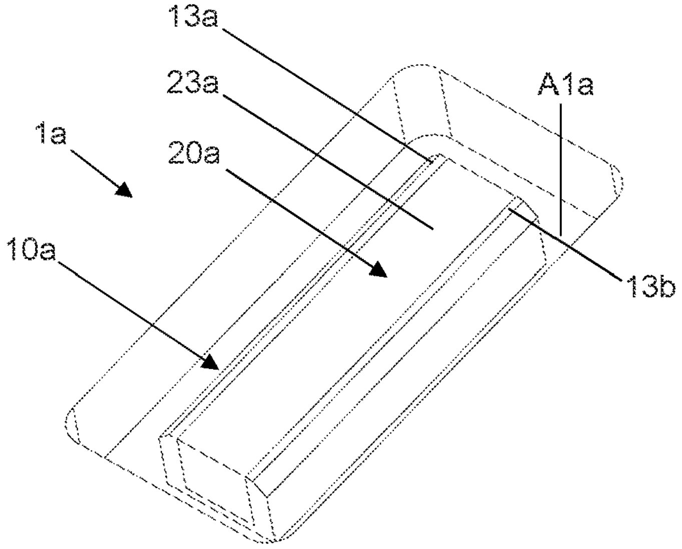

In this second phase, a fifth routing step E5 consists in simultaneously routing the two blanks 10*a*, 20*a*, which makes it possible to form a part of the finished vertical outer surfaces of the applique 1. In particular, this step makes it possible to form a significant part of the long sides 16, 17, in the first material, and a significant part of the small sides 5, 6, which comprise a juxtaposition of the two materials. At the end of this step, a blank 1*a* of the applique 1 to be produced is positioned in a cell A1*a* of the plate P1*a*, as shown in FIG. 7. It can be seen that the sides thus formed, the surface state of which is finished, extend over almost all of the height of the future applique 1.

A sixth surfacing step E6 makes it possible to form primarily the upper surface of the applique, in particular the lateral inclined surfaces 18, 19. More generally, it produces the final state of this upper surface, by acting on the two juxtaposed materials, thus forming the surfaces 13*a*, 13*b*, 23*a* of the applique 1 described above, as shown in FIG. 8.

In a seventh step E7, each cell A1*a* is filled with a UV adhesive C1*a* intended to rigidly secure each blank 1*a* of the applique 1 to the plate P1*a* for the subsequent steps.

Figure 9:
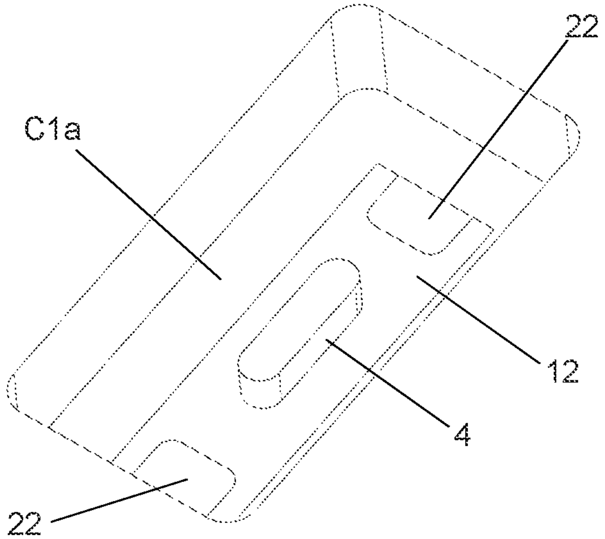
Figure 10:
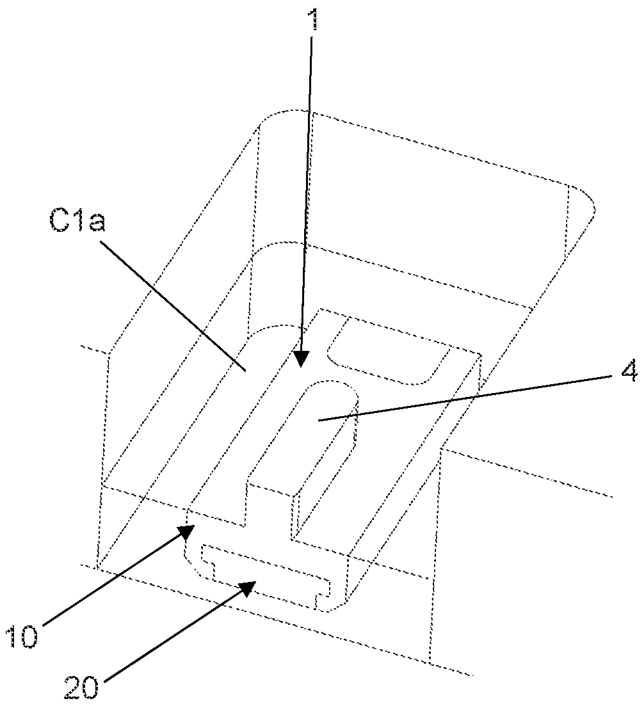

In an eighth step E8, the plate P1*a* is turned over. Next, in a ninth step E9, the fastening device 4, a foot according to this embodiment, of each of the blanks 1*a* of the applique 1 is routed, as shown in FIGS. 9 and 10. This ninth step E9 at the same time makes it possible to obtain the lower surfaces 12, 22 of the applique 1 in the finished state. At the end of this step, each applique 1 is finished, held in place on the plate P1*a* by virtue of the adhesive C1*a*.

A tenth step E10 consists in dissolving the adhesive C1*a*, so as to detach each applique 1 from the plate P1*a*.

Figure 11:
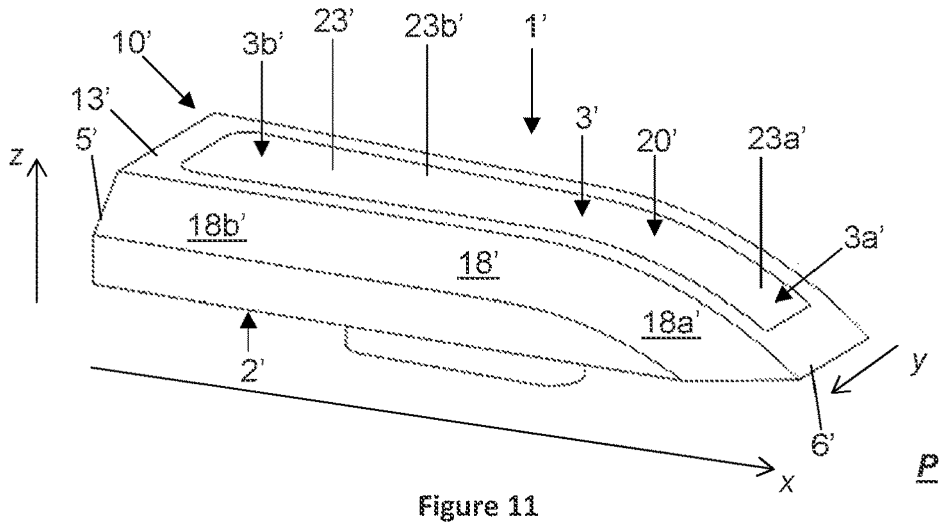
FIG. 11 shows a perspective view from above of an applique for a timepiece dial according to a first variant of a second embodiment of the invention.
Figure 12:
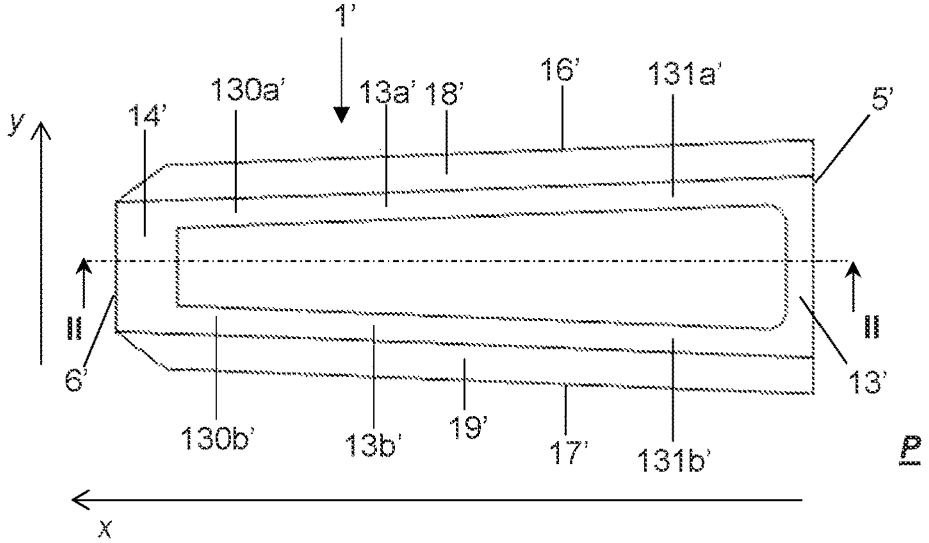
FIG. 12 shows a view from above of the applique for a timepiece dial according to the first variant of the second embodiment of the invention.
Figure 13:
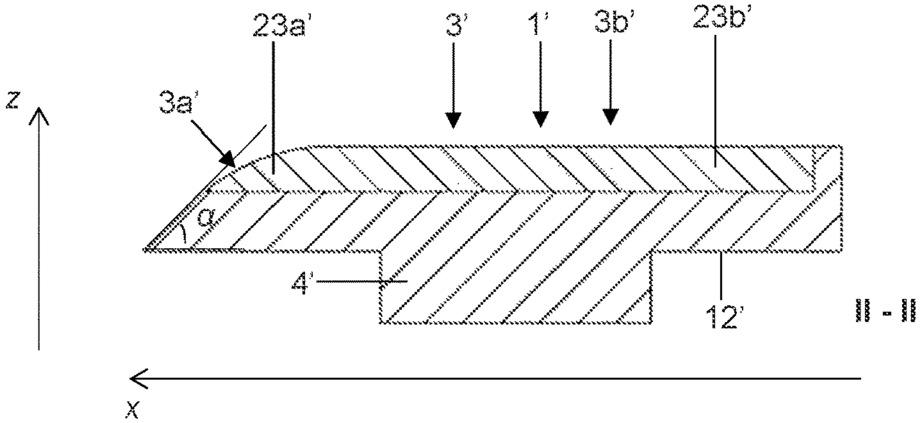
FIG. 13 shows a view in section through a longitudinal midplane II-II of the applique for a timepiece dial according to the first variant of the second embodiment of the invention.

FIGS. 11 to 13 show an applique 1' according to a first variant of a second embodiment. This applique 1' differs from that of the first embodiment essentially by the shape of its upper surface 3' which comprises at least an inclined part 3*a*' which is inclined relative to the plane x-y, with a slope steeper than the mere slope of the longitudinal chamfers forming the lateral inclined surfaces 18', 19'. As can be seen in FIGS. 11 and 13, the upper surface comprises an inclined part 3*a*' which extends over its entire width, in full section through a plane x-z, in a manner similar to the section through the midplane II-II shown in FIG. 13. In other words, the inclined part 3*a*' forms an inclined surface over the entire width of the applique. More specifically, this inclined surface extends in the transverse direction y in this embodiment.

The rest of the upper surface 3' takes the form of a substantially flat surface, which is oriented substantially parallel to a dial or to a dial plate or to a plane of a dial or of a dial plate to which the applique is intended to be fastened, like the upper surface 3 of the first embodiment. This will be referred to as the non-inclined surface 3*b'*.

According to this embodiment, the inclined part 3*a*' of the upper surface has a portion which is curved from the non-inclined surface 3*b*' of the upper surface 3', then a substantially flat portion, inclined at an angle $\alpha$ relative to this non-inclined surface 3*b*', and relative to the lower surface 2' of the applique 1'. Preferably, the angle $\alpha$ is between 5° and 80°, or even between 10° and 60°. As mentioned above, the inclined part 3*a*' extends over the entire width of the applique: it thus comprises lateral inclined parts 130*a*', 130*b*' which belong to the lateral surfaces 13*a*', 13*b*' made of the first material, which flank a central surface 23*a*', which belongs to the central surface 23' made of the second material. In other words, the inclined part 3*a*' also comprises the two juxtaposed materials, which form a continuous surface.

Moreover, the first portion 10' of the applique 1' comprises inclined surfaces 18', 19' at its lateral ends over all of the long sides 16', 17' of the applique 1', forming respectively a junction between the sides 16', 17' and the lateral surfaces 13*a*', 13*b*', as in the first embodiment. These inclined surfaces follow the first slope, mentioned above, of the upper surface 3'. Therefore, they also each comprise two parts, respectively a first part 18*a*', 19*a*' at the inclined surface 3*a*', and a second part 18*b*', 19*b*' at the non-inclined surface 3*b*'. The inclined surfaces 18*a*', 19*a*' thus each have two slopes, relative to a plane x-y and relative to a plane x-z, respectively, which are visible in sections through two planes x-z and y-z, respectively.

In the first variant of the second embodiment which is described, the first portion 10' of the applique 1' forms the contour of the applique, i.e. it alone defines the outer periphery of the applique. This is particularly visible when the applique is seen from above, as shown in FIG. 12. More particularly, it forms the two long sides 16', 17' and two small sides 5', 6'. The two small sides furthermore have different geometries. A first small side 5' is vertical, whereas the second small side 6' is in the continuity of the inclined part 3*a'*.

Moreover, according to the second embodiment, the applique 1' no longer has a parallelepiped shape. Its projection in the vertical direction z on a plane x-y is in fact no longer rectangular, but polygonal, in particular symmetrical relative to a longitudinal median axis. As an alternative, this projection could have any other shape. This shape may be curved, in particular rounded or elliptical.

Figure 18:
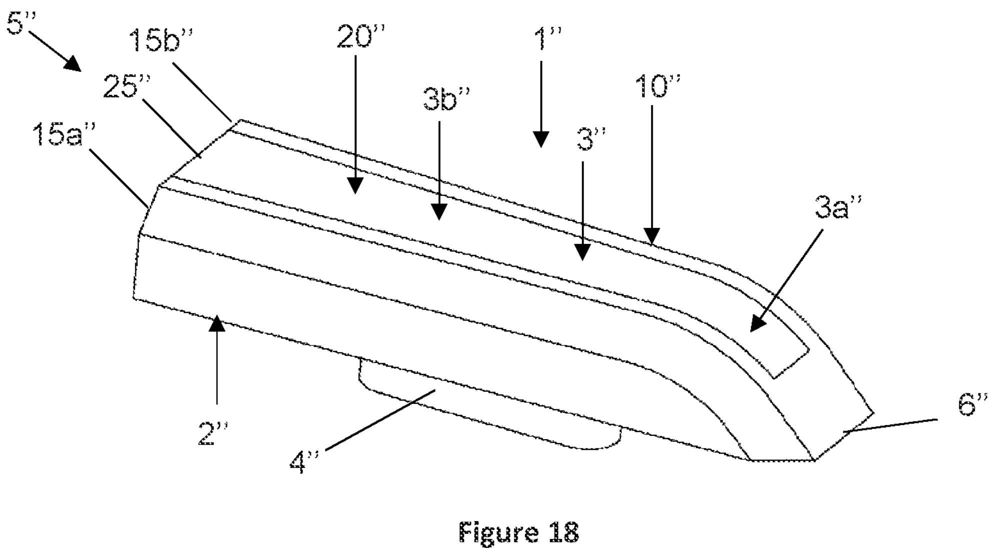
FIG. 18 shows a perspective view from above of an applique for a timepiece dial according to a second variant of the second embodiment of the invention.
Figure 19:
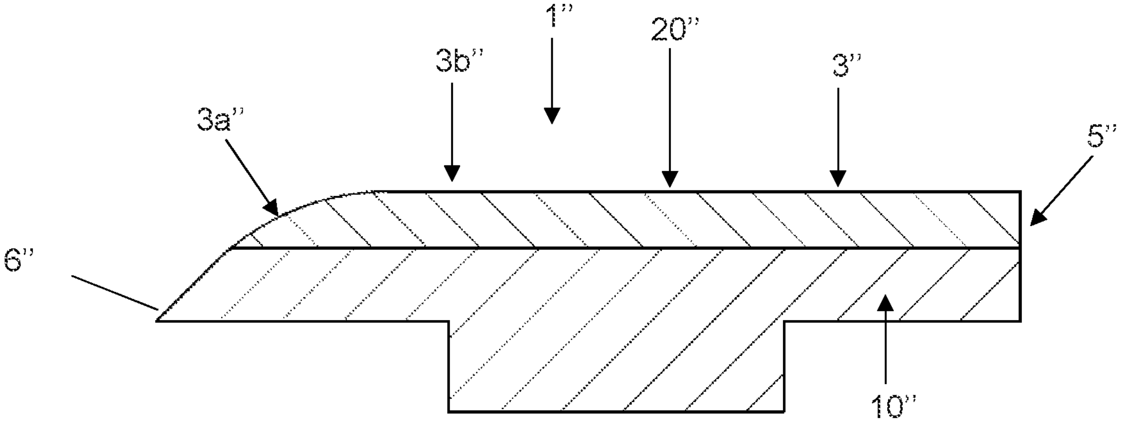
FIG. 19 shows a view in section through a longitudinal midplane of the applique for a timepiece dial according to the second variant of the second embodiment of the invention.
Figure 20:
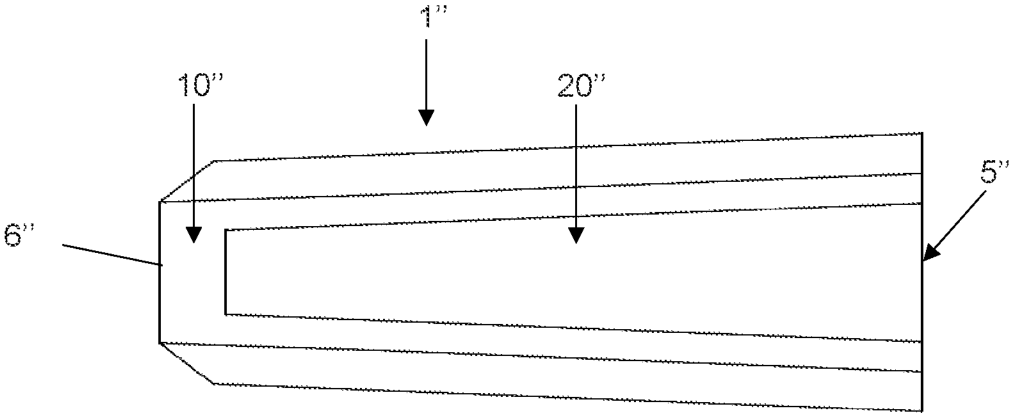
FIG. 20 shows a view from above of the applique for a timepiece dial according to the second variant of the second embodiment of the invention.

Naturally, the invention according to the second embodiment is not limited to the embodiment described. For example, the second portion 20' could, as an alternative, form at least partially the contour of the applique. This is already partially the case in the upper part of the inclined part 3*a*'. FIGS. 18 to 20 show a second variant of the second embodiment, in which an applique 1" differs from the first variant in terms of the vertical first small side 5", which is made of the two materials corresponding respectively to the two portions 10", 20". The first small side 5" comprises a central surface 25" made of the second material, flanked by two lateral surfaces 15*a*", 15*b*", respectively. The upper surface 3" comprises an inclined surface 3*a*" which is identical to that of the first variant. The second small side 6" is identical to that of the first variant.

In all of the embodiments of the applique, preferably, the first material of the first portion is a metal alloy, particularly a precious metal alloy such as an alloy of gold or platinum. Preferably, the second material of the second portion is a composite, in particular based on ceramic and/or polymer. This second material comprises, for example, binders and ceramic particles. It may optionally be filled with pigments, luminescent material or another functional material. In the case where this second material is luminescent, the latter may in particular comprise a luminescent zircon.

Naturally, the invention is not limited to the embodiments described. In particular, the inclined surface may be curved, rounded, over all or part of its length and/or its width, and/or comprise one or more flat portions. Thus, in particular, at least a part of the second portion of the applique is inclined relative to a surface parallel to a dial or to a dial plate or to a plane of a dial or of a dial plate to which said applique is intended to be fastened. Furthermore, this slope may be oriented in many directions. Thus, the inclined surface may be parallel to the transverse direction y or to the longitudinal direction x, and not parallel to the other two directions x, z or y, z, respectively. As a variant, the slope is such that the inclined part is oriented in a direction which is neither parallel to the vertical direction z, nor parallel to the longitudinal direction x, nor parallel to the transverse direction y. The upper surface of the applique thus has at least one part that is not parallel to the dial or to the dial plate on which the applique is intended to be fastened.

The applique 1', 1" according to the second embodiment is produced in a manner similar to the first embodiment.

FIGS. 14 to 17 show more particularly the differences in the production method compared to the first embodiment.

Figure 14:
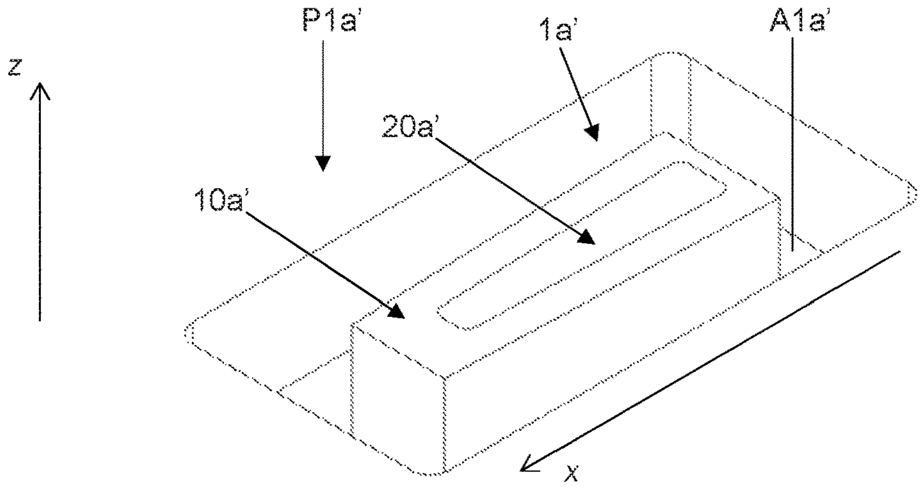
FIGS. 14 to 17 show various steps of a method for producing the applique for a timepiece dial according to the second embodiment of the invention.
Figure 15:
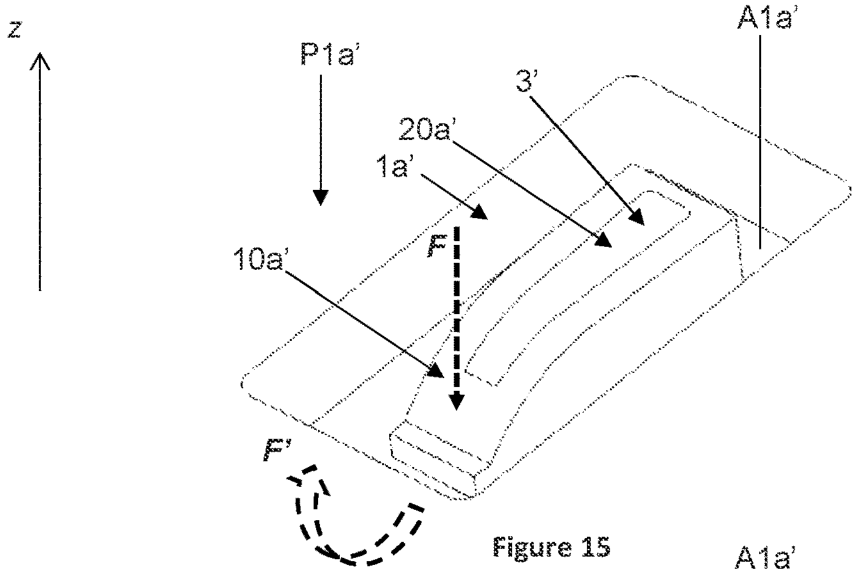

The production method for the second embodiment of the applique differs from the method for producing the applique of the first embodiment essentially in terms of the sixth surfacing step E6', the first steps E1' to E5' remaining the same. To be specific, during this sixth surfacing step E6', the upper surface 3' of the applique is formed, after a routing step E5' the outcome of which is shown in FIG. 14, and can be likened to step E5 of the method according to the first embodiment (FIG. 7). During this sixth surfacing step E6' for the second embodiment, shown in FIG. 15, the upper surface, which is initially flat and parallel to a plane x-y, is machined, so as to form a blank 1*a*' of an applique 1' comprising an upper surface 3' having at least one inclined part.

During this sixth surfacing step E6', an applique blank 1*a*' is machined, in particular in a direction z, along a path of the tool and/or of the table supporting the plate P1*a*' shown by an arrow F and/or an arrow F', respectively. To do so, the surfacing step E6', for the production of an applique 1' according to the second embodiment, has the particularity that it makes it possible to obtain the upper surface 3' comprising an inclined part, by removal of the first and second materials in at least longitudinal x and vertical z directions. This results in finished surfaces at the end of this step.

Figure 16:
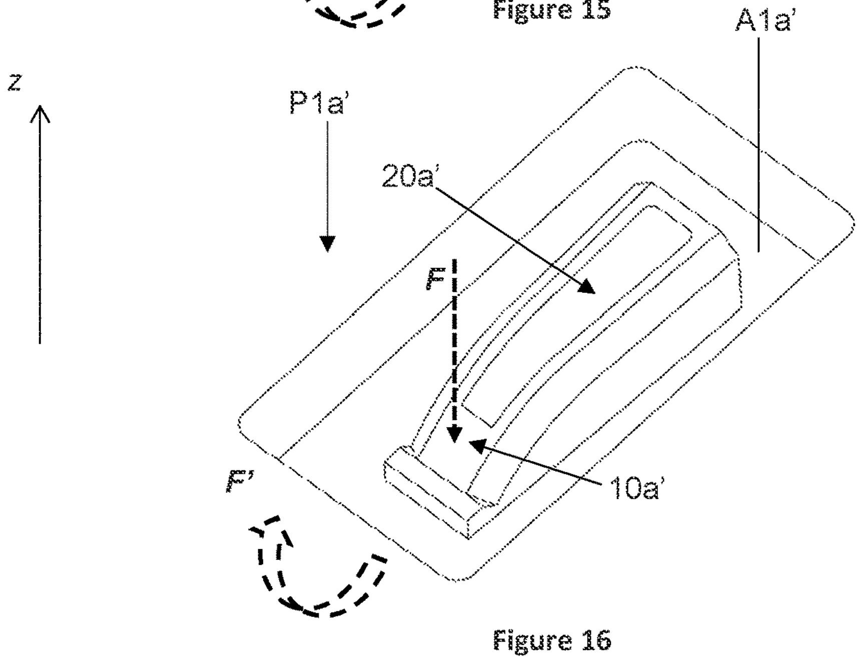

Preferably, this surfacing step E6' may also comprise a sub-step of chamfering or machining of the inclined surfaces 18', 19', as shown in FIG. 16. Preferably, this sub-step of chamfering or machining of the inclined surfaces 18', 19' takes place downstream of the abovementioned surfacing.

Dans a seventh step E7', each cell A1*a*' is filled with a UV adhesive C1*a* intended to rigidly secure each blank 1*a*' of an applique 1' to the plate P1*a*' for the subsequent steps.

Figure 17:
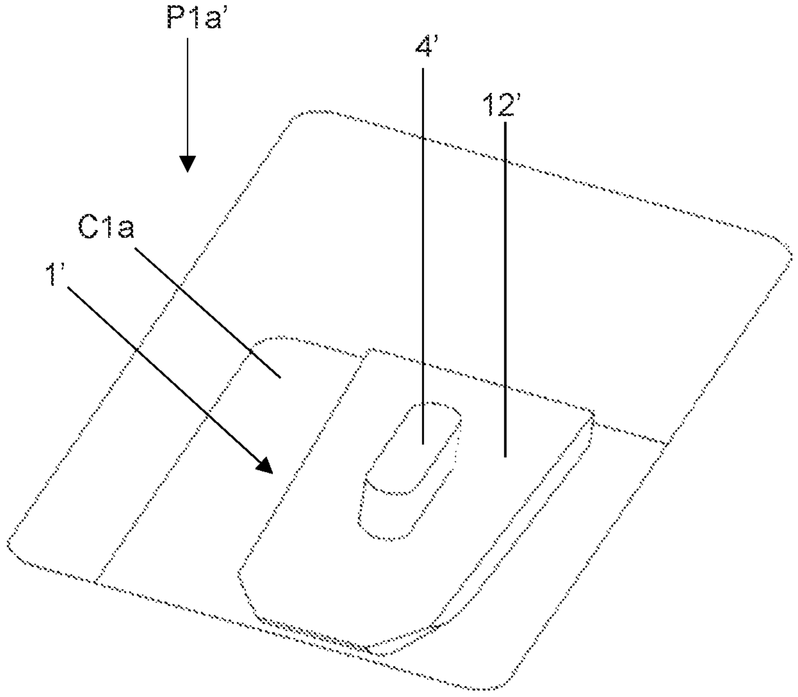

In an eighth step E8', the plate P1*a*' is turned over. Next, in a ninth step E9', the fastening device 4' of each of the blanks 1*a*' of the applique 1' is routed, as shown in FIG. 17. This fastening device 4' in this case takes the form of a foot. This step E9' at the same time makes it possible to obtain a lower surface 12' in the finished state. It also allows the routing of the end of the inclined surface 3', in this case taking the form of a pointed edge.

At the end of the ninth step E9', each applique 1' thus formed is held in place on the plate P1*a*' by virtue of the adhesive C1*a*. A tenth step E10' consists in dissolving the adhesive C1*a* applied during the seventh step E7', so as to detach the applique or appliques 1' from the adhesive.

Note that the production of the applique 1" according to the second variant of the second embodiment will be performed using the same method.

In all cases, the method for producing an applique according to the invention thus comprises a second phase of machining, which comprises in particular a step of machining of each of the two blanks of the applique, so as to modify the shape and/or the surface state of each of the first and second blanks of the applique blank, in particular on its upper surface.

Advantageously, this second phase of machining is mechanical, and comprises in particular a step of cutting the first and second materials of the applique blank using the same cutting tool. As an alternative or in addition, this second phase of machining may comprise a step of abrasion of the first and second materials of the applique blank using the same abrasion tool. In all cases, it involves simultaneous or substantially simultaneous machining of the first and second materials of the applique blank, in the same step using the same tool.

As an alternative or in addition, this second phase of machining may comprise a step of machining of the applique blank by a laser, in particular a femtosecond laser. It thus involves simultaneous or substantially simultaneous machining of the first and second materials of the applique blank, in the same step using the same laser.

The invention also relates to a method for producing a timepiece dial, which comprises implementing the method for producing at least one applique as described above, then a step of fastening said at least one applique to the timepiece dial.

The invention also relates to a method for producing a timepiece, in particular a wrist watch, which comprises implementing the method for producing a timepiece dial of the timepiece as described above.

Lastly, the invention relates to an applique for a timepiece dial produced by a method as described above, comprising at least a first portion made of a first material and a second portion made of a second material, said first and second materials being different, wherein the applique comprises a fastening device capable of fastening the applique to a dial, in particular a fastening foot, and an upper surface intended to remain on the visible face of said dial, said upper surface having at least a part that is not parallel to the dial to which the applique is intended to be fastened, said upper surface part comprising said two materials in a juxtaposed arrangement, and/or the applique comprises a side comprising said two juxtaposed materials, said side extending in a direction substantially perpendicular to the dial to which the applique is intended to be fastened.

The applique may comprise a lower surface on which the fastening device is arranged, and may have a projection, on a plane parallel to said dial to which it is intended to be fastened, of substantially rectangular shape. The applique may comprise four sides substantially perpendicular to said dial connecting the lower surface to the upper surface, these four sides being made integrally of the first material.

The second portion may extend from a first side over substantially the entire length of the applique, indeed over the entire length of the applique as far as a second side, at least on the upper surface of the applique.

The first portion made of the first material may comprise a groove, hollowed out from its upper surface and extending over all or some of the length of the applique, in which the second material forming the second portion is placed.

The upper surface of the applique may comprise a part of the second portion arranged between two parts of the first portion.

The section through a longitudinal-vertical plane and/or the section through a transverse-vertical plane of said part of the upper surface is not parallel to the dial to which the applique is intended to be fastened, and has a shape which is inclined, flat or curved, relative to said dial.

The invention also relates to a timepiece, in particular a wrist watch, and to a dial for a timepiece, which comprises at least one applique as described above.

The invention claimed is:

1. A method for producing an applique for a timepiece dial, the applique comprising at least two distinct portions made of a first material and a second material, respectively, the first and second materials being different, the applique comprising a lower surface by which the applique is intended to be fastened to the timepiece dial, an upper surface opposite the lower surface, and at least one side surface between the lower surface and the upper surface, the method comprising:

in a first phase, forming at least a second blank made of the second material within or at least partially within a first blank made of the first material so as to obtain a blank of the applique for a timepiece dial, then in a second phase, machining each of the first blank and the second blank, so as to modify a shape and a surface state of each of the first and second blanks of the applique blank, wherein the machining in the second phase comprises:

routing the applique blank formed of the first blank made of the first material and the second blank made of the second material, the routing forming at least a portion of a contour of the applique blank and forming a cell in which the applique blank is arranged, and surfacing the applique blank formed of the first blank made of the first material and the second blank made of the second material, the surfacing making it possible to form the side surface comprising the two materials in a juxtaposed arrangement.

2. The method for producing an applique for a timepiece dial as claimed in claim 1, wherein the machining in the second phase is mechanical and comprises at least one selected from the group consisting of cutting the first and second materials of the applique blank using a cutting tool, carrying out abrasion of the first and second materials of the applique blank using an abrasion tool, laser machining, substantially simultaneous machining the first and second materials of the applique blank, in a same machining action using a same machining tool.

3. The method for producing an applique for a timepiece dial as claimed in claim 1, wherein the surfacing forms the upper surface, the upper surface comprising the two materials in a juxtaposed arrangement.

4. The method for producing an applique for a timepiece dial as claimed in claim 3, wherein the surfacing makes it possible to form the upper surface with a shape that is not parallel to the timepiece dial to which the applique is intended to be fastened.

5. The method for producing an applique for a timepiece dial as claimed in claim 1, wherein the applique for a timepiece dial comprises at least one side comprising the two materials in a juxtaposed arrangement, extending in a direction substantially perpendicular to the dial to which the applique is intended to be fastened, and wherein the routing makes it possible to form all or some of the side.

6. The method for producing an applique for a timepiece dial as claimed in claim 1, wherein the forming in the first phase comprises forming the first blank made of the first material, then obtaining the second blank by filling the second material in the first blank, followed by curing the second material.

7. The method for producing an applique for a timepiece dial as claimed in claim 1, wherein the forming in the first phase comprises forming the first blank by:

obtaining a flat plate made of the first material; and machining a first face of the plate so as to form at least the first blank.

8. The method for producing an applique for a timepiece dial as claimed in claim 7, wherein the machining of the first face of the plate forming the first blank forms at least one cavity and wherein the forming in the first phase comprises forming the second blank by filling the second material in the at least one cavity followed by curing the second material.

9. The method for producing an applique for a timepiece dial as claimed in claim 8, further comprising, after the machining of each of the first blank and the second blank forming a cell, filling the cell with an adhesive, then routing the at least one applique blank from a second face of the plate, opposite to the first face, followed by detaching the timepiece dial applique from the plate by removing the adhesive.

10. The method for producing a timepiece dial applique as claimed in claim 1, wherein the first material is a metal or a metal alloy, and wherein the second material is a composite.

11. A method for producing a timepiece dial with an applique, which comprises:

implementing the method for producing at least one applique as claimed in claim 1, then fastening the at least one applique to the timepiece dial.

12. A method for producing a timepiece having a dial, which comprises:

producing the dial by implementing the method for producing a timepiece dial with an applique as claimed in claim 11.

13. An applique for a timepiece dial produced by a method as claimed in claim 1, comprising:

the first portion made of the first material, and the second portion made of the second material, the first and second materials being different, wherein the applique comprises at least one of the following:

a fastening device capable of fastening the applique to the timepiece dial, and an upper surface intended to remain on a visible face of the timepiece dial, the upper surface having at least a part that is not parallel to the timepiece dial to which the applique is intended to be fastened, the upper surface part comprising the first and second materials in a juxtaposed arrangement, a side comprising the first and second materials in a juxtaposed arrangement, the side extending in a direction substantially perpendicular to the timepiece dial to which the applique is intended to be fastened.

14. The applique for a timepiece dial as claimed in claim 13, wherein the first material is a metal or a metal alloy, and the second material is a composite.

15. A timepiece dial, which comprises at least one applique as claimed in claim 13.

16. The method for producing an applique for a timepiece dial as claimed in claim 4, wherein the upper surface has a flat shape.

17. The method for producing an applique for a timepiece dial as claimed in claim 4, wherein the upper surface has a curved shape.

18. The method for producing an applique for a timepiece dial as claimed in claim 8, wherein the filling of the second blank is carried out by casting the second material in the at least one cavity.

19. The method for producing an applique for a timepiece dial as claimed in claim 9, wherein the timepiece dial applique is detached from the plate by dissolving the adhesive.

20. A method for producing a plurality of appliques for a timepiece dial, each of the appliques comprising at least two distinct portions made of a first material and a second material, respectively, the first and second materials being different, each of the appliques comprising a lower surface by which the applique is intended to be fastened to the timepiece dial, an upper surface opposite the lower surface, and at least one side surface between the lower surface and the upper surface, the method comprising:

performing the method as claimed in claim 1 to produce each of the appliques, wherein in the first phase, for each of the appliques, at least a respective second blank made of the second material is formed within or at least partially within a respective first blank made of the first material so as to obtain a respective blank of the respective applique for a timepiece dial, then in the second phase, machining, for each of the appliques, each of the respective first blank and the respective second blank is machined, so as to modify the shape and the surface state of each of the respective first blank and the respective second blank of the respective applique blank, wherein the machining in the second phase comprises;

routing each of the applique blanks formed of the respective first blank made of the first material and the respective second blank made of the second material, the routing forming at least a portion of a contour of each of the applique blanks and forming a plurality of cells, each of the applique blanks being arranged in a respective one of the plurality of cells.

21. The method for producing an applique for a timepiece dial as claimed in claim 20, wherein the method comprises, after the machining, for each of the applique blanks, of each of the respective first blank and the respective second blank forming a cell, filling each of the cells with an adhesive, then routing each of the applique blanks from a second face of the plate, opposite to the first face, followed by detaching each of the timepiece dial appliques from the plate by removing the adhesive.

22. A method for producing an applique for a timepiece dial, the applique comprising at least two distinct portions made of a first material and a second material, respectively, the first and second materials being different, the applique comprising a lower surface by which the applique is intended to be fastened to the timepiece dial, an upper surface opposite the lower surface, and at least one side surface between the lower surface and the upper surface, the method comprising:

in a first phase, forming at least a second blank made of the second material within or at least partially within a first blank made of the first material so as to obtain a blank of the applique for a timepiece dial, then in a second phase, machining each of the first blank and the second blank, so as to modify a shape and a surface state of each of the first and second blanks of the applique blank, and after the machining of each of the first blank and the second blank forming a cell, filling the cell with an adhesive, then routing the at least one applique blank from a second face of the plate, opposite to the first face, followed by detaching the timepiece dial applique from the plate by removing the adhesive, wherein the forming in the first phase comprises forming the first blank by:

obtaining a flat plate made of the first material; and machining a first face of the plate so as to form at least the first blank, wherein the machining in the second phase comprises:

routing the applique blank formed of the first blank made of the first material and the second blank made of the second material, the routing forming at least a portion of a contour of the applique blank and forming a cell in which the applique blank is arranged, and surfacing the applique blank formed of the first blank made of the first material and the second blank made of the second material, the surfacing making it possible to form (i) the upper surface comprising the two materials in a juxtaposed arrangement, and/or (ii) the side surface comprising the two materials in a juxtaposed arrangement.

23. An applique for a timepiece dial, comprising:

a first portion made of the first material, and a second portion made of the second material, the first and second materials being different, a lower surface by which the applique is intended to be fastened to the timepiece dial, an upper surface opposite the lower surface, and at least one side surface between the lower surface and the upper surface, wherein the applique comprises at least one of the following:

a fastening device capable of fastening the applique to the timepiece dial, the upper surface being intended to remain on a visible face of the timepiece dial, the upper surface having at least a part that is not parallel to the timepiece dial to which the applique is intended to be fastened, the upper surface part comprising the first and second materials in a juxtaposed arrangement, a side surface comprising the first and second materials in a juxtaposed arrangement, the side surface extending in a direction substantially perpendicular to the timepiece dial to which the applique is intended to be fastened, wherein the applique has been produced by a method comprising:

in a first phase, forming at least a second blank made of the second material within or at least partially within a first blank made of the first material so as to obtain a blank of the applique, then in a second phase, machining each of the first blank and the second blank, so as to modify a shape and a surface state of each of the first and second blanks of the applique blank, wherein the machining in the second phase comprises:

routing the applique blank formed of the first blank made of the first material and the second blank made of the second material, the routing forming at least a portion of a contour of the applique blank and forming a cell in which the applique blank is arranged, and surfacing the applique blank formed of the first blank made of the first material and the second blank made of the second material, the surfacing making it possible to form (i) the upper surface comprising the two materials in the juxtaposed arrangement, and/or (ii) the side surface comprising the two materials in the juxtaposed arrangement.

* * * * *